US008685525B2

(12) United States Patent
Sanderson et al.

(10) Patent No.: US 8,685,525 B2
(45) Date of Patent: Apr. 1, 2014

(54) SURFACE FOR CONTROLLING LIQUIDS

(76) Inventors: James Sanderson, Toronto (CA); Bradley R. MacLean, Toronto (CA)

(*) Notice: Subject to any disclaimer, the term of this patent is extended or adjusted under 35 U.S.C. 154(b) by 0 days.

(21) Appl. No.: 13/458,175

(22) Filed: Apr. 27, 2012

(65) Prior Publication Data

US 2012/0213972 A1 Aug. 23, 2012

Related U.S. Application Data

(63) Continuation of application No. 13/152,522, filed on Jun. 3, 2011, now Pat. No. 8,187,693, which is a continuation of application No. 11/256,699, filed on Oct. 24, 2005, now Pat. No. 7,976,929.

(30) Foreign Application Priority Data

Oct. 22, 2004 (CA) .................................. 2485802

(51) Int. Cl.
*B32B 3/00* (2006.01)
*B32B 3/28* (2006.01)
*B32B 3/30* (2006.01)
*B32B 1/00* (2006.01)
*B32B 3/12* (2006.01)

(52) U.S. Cl.
USPC ........................... 428/156; 428/167; 428/178

(58) Field of Classification Search
USPC ............ 428/156, 178, 188, 167, 180; 15/215, 15/216, 217, 238; 4/581, 251.1; 296/97.23; 184/106
See application file for complete search history.

(56) References Cited

U.S. PATENT DOCUMENTS

| 269,418 A | 12/1882 | Holton |
| 443,331 A | 12/1890 | Price |
| 1,970,754 A | 4/1933 | Jonasen |
| D158,712 S | 4/1949 | Breneman |
| 2,810,671 A | 3/1956 | Taylor |
| 2,968,882 A | 1/1961 | Ozeki |
| 3,044,575 A | 7/1962 | Minutillo |
| 3,348,801 A | 10/1967 | Deason |
| 3,605,166 A | 9/1971 | Chen |
| 3,886,620 A | 6/1975 | Miller et al. |
| 4,246,982 A | 1/1981 | Pretnick |
| 4,280,729 A | 7/1981 | Morawski |
| 4,406,492 A | 9/1983 | Cackowski |
| 4,432,529 A | 2/1984 | McMillan |
| 4,484,661 A | 11/1984 | Evenson |
| 4,497,147 A | 2/1985 | Clapper et al. |
| 5,161,710 A | 11/1992 | Chumley |
| D356,228 S | 3/1995 | Sano |
| 5,478,625 A | 12/1995 | Wright |
| 5,711,402 A | 1/1998 | Sumpter, Sr. |

(Continued)

*Primary Examiner* — Catherine A Simone
(74) *Attorney, Agent, or Firm* — The Webb Law Firm

(57) ABSTRACT

A liquid controlling surface, comprising a formation comprising a plurality of individual open topped, closed bottomed cells for containing liquid with each of the cells having a cell wall integral with the closed bottom and defining a well. Each of the cell walls have a top edge. The surface also includes a plurality of distribution channels extending between adjacent cells and being positioned on the cell wall at a height to permit liquid to drain to the adjacent cell when a cell liquid level exceeds a predetermined limit and to permit liquid to be retained in the well up to the limit. At least some of the cell walls are sized and shaped to define contact areas at the top edges to support an object above the limit.

33 Claims, 16 Drawing Sheets

(56) References Cited

U.S. PATENT DOCUMENTS

| | | |
|---|---|---|
| D393,238 S | 4/1998 | Kraines |
| 5,776,583 A | 7/1998 | Peyton |
| 5,958,538 A | 9/1999 | Kessler |
| 5,972,470 A | 10/1999 | Engst |
| D422,256 S | 4/2000 | Lu |
| 6,102,086 A | 8/2000 | Holtby |
| 6,316,509 B1 | 11/2001 | Degerman |
| D458,884 S | 6/2002 | Kraines |
| 6,446,275 B1 | 9/2002 | Wright et al. |
| 6,451,400 B1 | 9/2002 | Brock et al. |
| D469,726 S | 2/2003 | Kraines |
| D471,850 S | 3/2003 | Kraines |
| 6,605,333 B2 | 8/2003 | Neri et al. |
| 6,610,382 B1 | 8/2003 | Kobe et al. |
| 6,677,027 B1 | 1/2004 | Lu |
| 6,713,138 B2 | 3/2004 | Griner |
| D491,122 S | 6/2004 | Kraines |
| 6,777,062 B2 | 8/2004 | Skaja |
| 6,794,013 B1 | 9/2004 | Iacovelli et al. |
| 7,976,929 B2 * | 7/2011 | MacLean et al. ............ 428/156 |
| 8,187,693 B2 * | 5/2012 | Sanderson et al. ............ 428/156 |
| 2002/0106480 A1 | 8/2002 | Vallieres |
| 2003/0141150 A1 | 7/2003 | Bemis |
| 2004/0067337 A1 | 4/2004 | Lafleur |

* cited by examiner

SURFACE FOR CONTROLLING LIQUIDS

CROSS-REFERENCE TO RELATED APPLICATIONS

This application is a continuation of U.S. patent application Ser. No. 13/152,522 filed on Jun. 3, 2011, which is a continuation of U.S. patent application Ser. No. 11/256,699 filed on Oct. 24, 2005, now U.S. Pat. No. 7,976,929, and which claims priority to Canadian Patent Application No. 2,485,802 filed on Oct. 22, 2004, the entire contents of which are all incorporated herein by reference.

FIELD OF THE INVENTION

The present invention relates to the field of liquid spill control. More particularly, the invention pertains to surfaces for liquid spill control.

BACKGROUND OF THE INVENTION

There are a number of different applications in which surface mats may be used for the control of liquids. These applications include car surface mats for controlling slush, snow, and water falling from the shoes and boots of drivers and passengers. Such liquid controlling surfaces may also be used as platforms for storing wet shoes and boots at house and office entrances. Such surfaces may also be used to control water falling from a person who has just exited a bath or shower.

There have been previous attempts to manage liquid spills using mats. For example, U.S. Pat. No. 5,776,583 ("Peyton") discloses a surface mat system. In the Peyton surface mat, a plurality of rectangular cells are formed, with each cell having a drain hole 14. The drain holes 14 are formed in a continuous web, which web overlies a hollow portion supported by a plurality of pillars 36. Liquid contacting the mat goes through the drain holes into the hollow portion. There are a number of problems with the Peyton design. First, the Peyton design requires a complex two-layer structure, complete with cells, a lower hollow portion, and pillars to maintain the structural integrity of the mat. Without the complex series of pillars, the mat would be crushed or broken by a heavy weight placed upon it, and the water would squirt out through the drain holes. Second, the area of the mat between the cells, where a person's pant leg or shoe might rest, contains a substantial amount of flat surface area on which liquid can collect, thus undesirably coming into contact with clothing.

U.S. Pat. No. 4,246,982 ("Pretnick") discloses a mat having a plurality of ribs that define rectangular chambers. A center tray section is positioned between the two sets of rectangular chambers. As shown in FIG. 7, the inner sides of the sets of chambers 12 and 14 are provided with drain holes 61 to provide drainage of drippings into the center of the tray and then out through a garden hose drain attachment at 32. This configuration is complex to manufacture, in that it requires manufacture of separate tray and rib sections. Furthermore, this configuration also presents a substantial surface area that can easily come in contact with, and undesirably transfer liquid to, objects such as shoes or clothing.

SUMMARY OF THE INVENTION

Therefore, what is desired is a liquid controlling surface that is effective in controlling spills and that can be simply constructed. Preferably, the surface will be configured to distribute liquid from the point of origin of a spill to other portions of the surface while still controlling the liquid. Preferably, the liquid-controlling surface is configured to reduce the likelihood of liquid being transferred from the surface to an object resting thereon.

Therefore, there is provided a liquid controlling surface comprising:

a formation comprising a plurality of individual open topped, closed bottomed cells for containing liquid, each of said cells having a cell wall defining a well;

a plurality of distribution channels extending between adjacent cells and being positioned on the cell wall at a height to permit liquid to drain to the adjacent cell when a cell liquid level exceeds a predetermined limit and to permit liquid to be retained in said well up to said limit; and a perimeter wall surrounding said cells and having a height higher than said distribution channels to prevent liquid from leaking from said cells to an area outside the perimeter wall.

Optionally, each distribution channel is configured so as to prevent an object resting on top of the internal cell wall from contacting liquid in the cells or the distribution channel. Preferably, to create a surface that minimizes the transference of liquid when contacted, the internal cell walls are tapered towards their tops so as to reduce the potential contact area between the surface and an object resting thereon.

BRIEF DESCRIPTION OF THE DRAWINGS

Reference will now be made, by way of example only, to the drawings, which illustrate the referred embodiment of the invention, and in which.

DETAILED DESCRIPTION OF THE PREFERRED EMBODIMENTS

Figure 2:
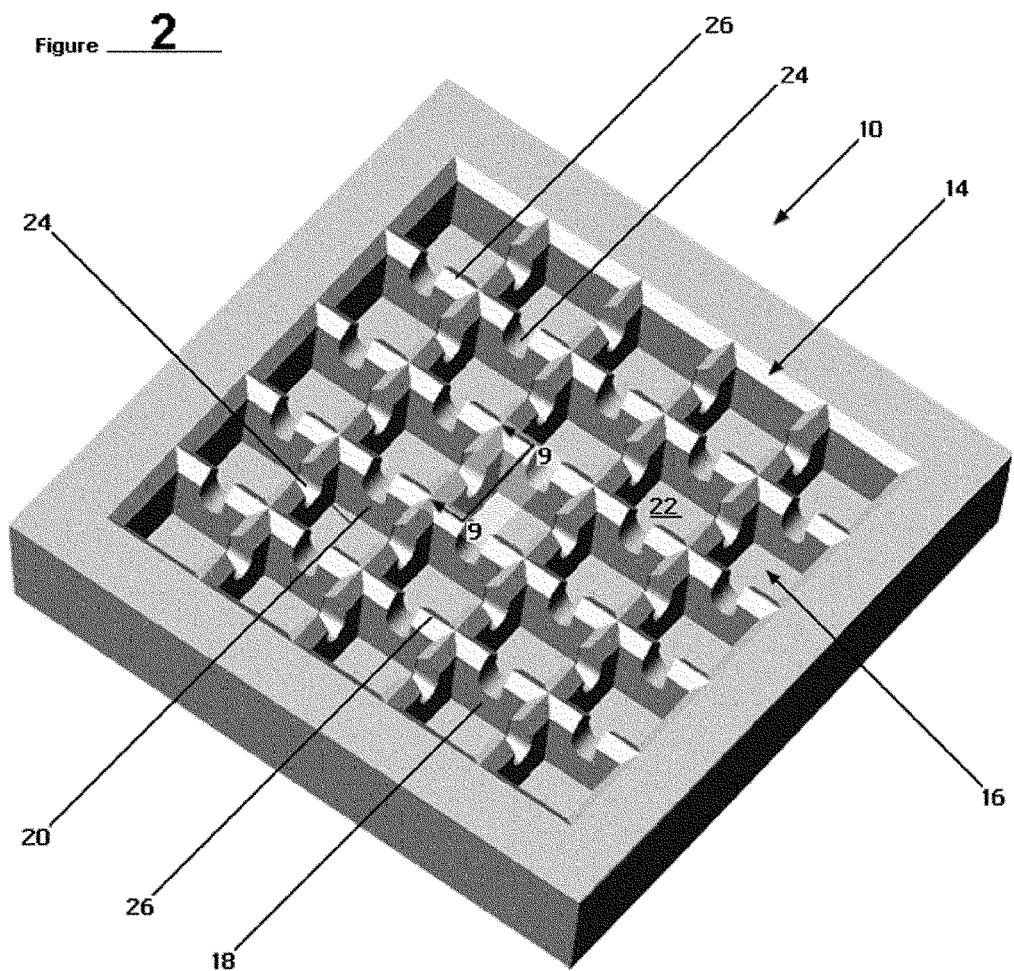
FIG. 2 is a perspective view of a second embodiment of the surface.
Figure 8:
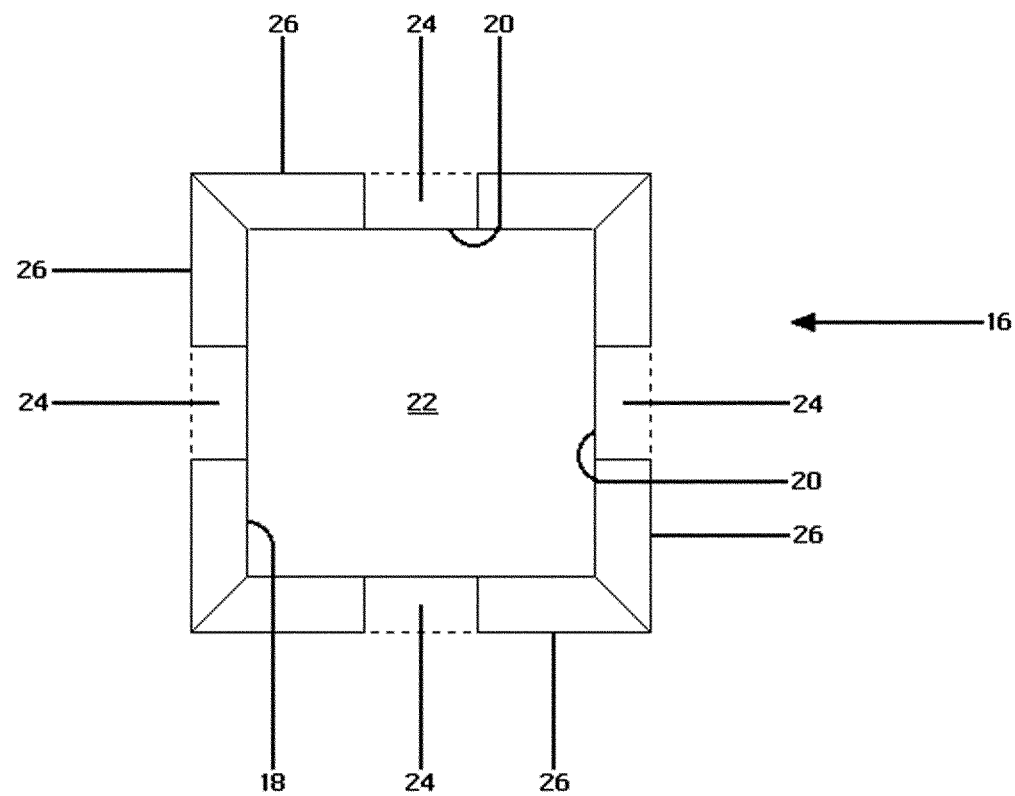
FIG. 8 is a plan view of a single cell of the surface shown in FIG. 2.
Figure 9:
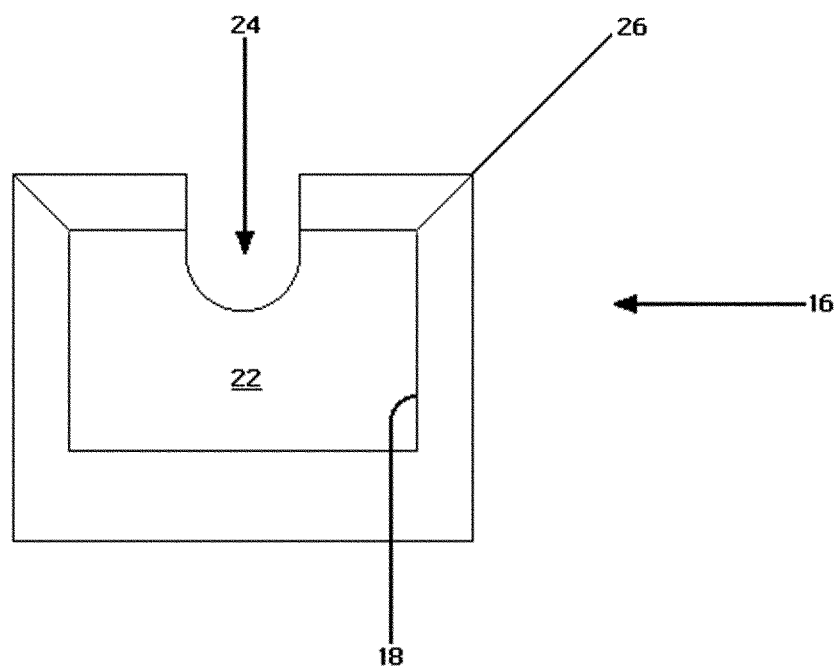
FIG. 9 is a cross-sectional elevation view taken along line 9-9 of FIG. 2.

Referring first to FIGS. 2, 8, and 9, a liquid controlling surface 10 according to a first embodiment of the present invention is shown. The surface 10 comprises a perimeter wall 12 for preventing liquid contained in the surface 10 from leaking to an area outside the wall 12. The perimeter wall 12 surrounds a formation 14 comprising a plurality of individual cells 16 for containing liquid. Each cell 16 comprises a cell wall 18, which may comprise one or more wall sections 20. In the preferred embodiment, each cell includes a well 22 to hold the liquid, and the well 22 is defined by, and preferably surrounded by, the wall 18.

Preferably, the cells 16 are generally rectangular in plan view (i.e. when viewed from above the surface) open topped and closed bottomed. It will be appreciated that such an open topped cell shape is preferred, because it facilitates the manufacture of surfaces 10 in, for example, a convenient rectangular shape. However, the invention comprehends other shapes for the cells 16, as described in more detail below. What is required is for each cell to comprise a well to contain a volume of liquid within the cell.

The surface further includes a plurality of distribution channels 24 between the wells of adjacent cells. In the most preferred embodiment there is a distribution channel 24 connecting each cell 16 to each adjacent cell 16, but less could be used without departing from the scope of the present invention. Each distribution channel 24 is positioned on the internal cell wall 18 at a height so as to channel liquid to the adjacent cell 16 when a cell liquid level exceeds a predetermined limit. It will be appreciated that, preferably, this limit is determined by the height of the channel 24 on the wall 18, relative to the bottom of the well of the cell. When the liquid level within a well 22 reaches the height of the channels 24, any additional liquid will be channelled to an adjacent cell 16 through gravity. The higher the channel 24 on the wall 18, the higher the limit, and the more liquid can be held within the well 22 before additional liquid is channelled or permitted to drain to an adjacent cell 16.

Preferably, the perimeter wall 12 will have a height higher than that of the channels 24 to prevent liquid from leaking from the cells 16 to an area outside the perimeter wall 12. Also, preferably, this will prevent liquid from moving onto the top of the perimeter wall 12 itself, thus lessening the probability that an object (e.g. a shoe of a user), will have liquid transferred onto it from the top of the perimeter wall 12.

In the preferred embodiment, the channels 24 are arcuate depressions in the walls 18, open to the top of the surface 10. However, it will be appreciated that the channels 24 can take other forms. For example, the channels could take the form of the holes in the walls 18, wherein the hole is surrounded entirely by the wall 18, and is not open to the top of the surface 10. As another example, the channels 24 can be squared, or V-shaped. Other shapes are also comprehended by the invention. The use of channels 24 that are arcuate depressions in the walls 18 is preferred because such channels 24 are relatively simple to create in a rubber moulding process that can be used to manufacture the surface 10.

Preferably, the channels 24 are configured so as to prevent an object resting on the walls 18 from contacting liquid in the cells 16 or channels 24. It will be appreciated that one preferred feature of the surface is to control spilled liquid while preventing the liquid, to the extent possible, from being tracked around, and from wetting the shoes and/or clothing of someone contacting the surface. The preferred surface reduces the likelihood of this outcome by preventing an object from contacting the liquid in the well 22 or channels 24.

In the preferred form of the invention the channels limit the level of liquid which can be retained in the wells 22 to a level below the tops of the cell walls. The exact height of the channels 24 will vary, depending upon the application in which the surface of the present invention is being used. For example, for a surface comprised of a flexible material which has to carry a heavy load, the liquid level may be set quite low, at or about one third of the height of the cell wall. In other applications, where the cell wall is more rigid or the load is lighter, the liquid level of the cell can be higher, up to about 80% of the cell wall height. Even higher liquid levels can be used, but the risks of not being able to prevent contact between the liquid and an object resting upon the liquid are higher so these higher levels are generally less preferred. In summary, a preferred range for the height of the channels is between 20% to 80% of the total cell wall height, with between 40% and 60% being the most preferred range of heights.

It will be also understood that another factor influencing the preferred height of the drainage channels is the type of liquids spills that the surface is intended to encounter. If the drainage channels are lower, then spills can more quickly disperse through the correspondingly larger sized drainage channels. Conversely higher walls, while permitting each well to retain a larger volume of fluid will take longer to disperse the fluid across the adjoining cells.

It will be appreciated that the surface 10 can take various forms and still be comprehended by the invention. The surface 10 may take a conventional form, namely, a one-piece surface-covering element. However, for example, the surface 10 may have a multi-piece, modular construction. In this configuration, surface elements can be manufactured, and multiple elements connected together to build mats whose size and shape can be varied according to the circumstances in which the surface 10 will be employed. As another example, the surface 10 can be used in association with modular flooring and the like. In modular flooring, the floor in a location is built in modules and the modules are laid down adjacent to one another to form the floor. The invention comprehends the surface 10 taking the form of a floor module. In this application, the floor module consisting of the surface 10 can be built right into the floor, and positioned to perform its desired function.

Preferably, the surface 10, including the formation 14 and wall 12, is composed of a somewhat flexible water-resistant material, such as moulded rubber, most preferably rubber sourced from recycled tires. This embodiment is preferred for a number of reasons. First, a moulding process is efficient for manufacturing large numbers of surfaces 10 relatively inexpensively. Second, the use of recycled tire rubber puts such material to good use, thus reducing the need to dispose of used tires. Third, a moulding process is effective in producing a surface 10 wherein the formation 14 and wall 12 have a unitary (i.e. one-piece) construction. With such a construction, a mat or surface application 10 can be produced in one moulding step, and the basic components of the surface 10 (the formation 14 and wall 12) are easily usable and manipulable—there is no need to deal with multiple pieces.

It will be appreciated, however, the surface 10 may be manufactured in any suitable way and still be comprehended by the invention. For example, the surface 10 may be made of plastic. The surface 10, whether made of plastic or another material, may be made from material recycled from a pre-existing use or product. In addition, the surface 10 may be moulded, or manufactured using a different process.

According to another aspect of the present invention, the surface 10 is configured so as to reduce the contact area between the surface 10 and any object resting thereon. It will be appreciated that, for many of the possible uses of the surface 10, it is desirable for the liquid to remain in the surface 10, and not touch an object that comes in contact with the surface 10. For example, if the surface 10 is used to catch water and slush brought into vehicles by riders in the vehicles, it is desirable that the skirts and pants of riders not get wet if they come in contact with the surface 10. As another example, the surface 10 may be used to catch liquid spills from cars or trucks being repaired. It will be appreciated that oil, coolant fluid, brake fluids and the like from cars often undesirably stain surfaces, driveways, and other similar surfaces. The surface 10 can be positioned under the car or truck during repair to control oil spills. In this application, it is also desirable that oil not be transferred from the surface 10 to shoes, clothing, or car tires.

For the most part, the liquid contacting the surface 10 will enter the wells 22 of the cells 16. However, some of the liquid will remain, in a thin layer, on the contact area presented by the upper side of the surface 10. Thus, to reduce the likelihood of transferring such liquid to an object coming in contact with the surface 10, the walls 18 are preferably tapered towards their tops 26 so as to reduce the contact area between the surface 10 and an object resting thereon. Most preferably, the walls 18 are tapered at their tops 26 substantially to a point (i.e. a pointed edge as shown in FIG. 2). Thus, these points will constitute the reduced contact area between the surface 10 and an object resting thereon, in contrast to untapered walls.

In addition, such a tapered top edge of the cell wall permits any liquid which comes into contact with the water-resistant upper edge of the cell wall to quickly drain off the upper edge and into the wells below on either side of the wall. In this way, even if the upper edge is wetted with such a liquid in the beginning, the sloped drainage surface will carry the liquid down away from the upper edge of the cell wall.

It will be appreciated that the tapered construction further provides good structural integrity to the walls 18, because the walls 18 are thicker at their bases than at their tops. Thus, it has been found that a surface 10 with this configuration can carry substantial weight without the walls 18 being crushed or broken. Thus, for example, in the car repair application, the tapered construction allows a car to drive on the surface 10 without crushing or deforming it, while the pointed tops 26 present a reduced contact area that prevents the car from tracking substantial amounts of oil onto the ground with its wheels. Of course, it will be appreciated by those skilled in the art that the strength of the flexible material used in forming the surface 10 will have a bearing on the load capacity of the cell wall 18. Further, the size of the individual cells 16 will determine how much of any given area of the surface 10 is comprised of open wells 22 as compared to load supporting walls 18. Thus the size of the walls 18, the size of the cells 16 and the typical load being supported can be used, in conjunction with the strength of the material from which the surface 10 is made, to determine the optimal dimensions for both the cell wall thickness and cell size.

It will be appreciated, however, that for some uses of the surface 10, reduction in contact area is less important, while other factors are more important. For example, in one preferred application of the present invention, the surface 10 is used in a bathroom for gathering dripping liquid as a person steps out of a shower or bath. In such a case, the user's bare feet will contact the surface 10. While preventing water from contacting the user's feet is not particularly important in this case, because the user is already wet, it is preferred that the surface 10 be comfortable against the user's feet, and that the surface have a sufficient liquid retaining capacity to hold the liquid dripping off the bather.

Figure 1:
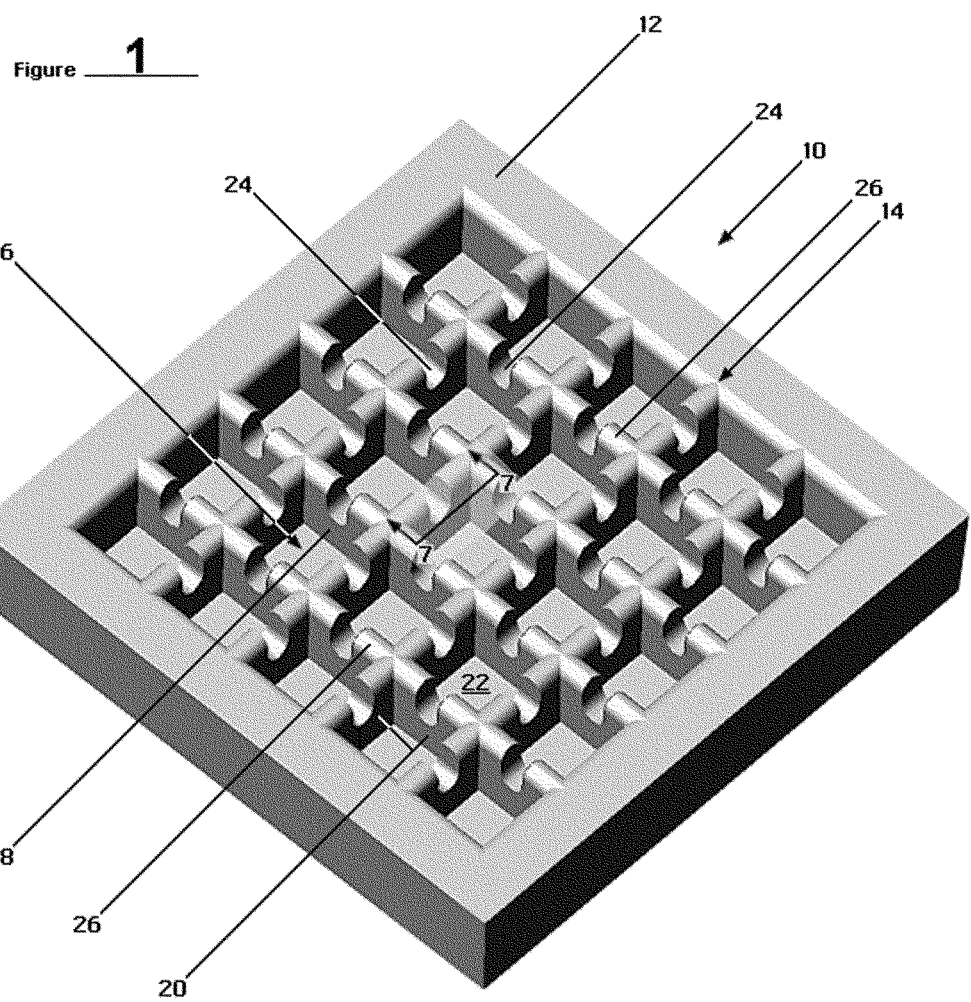
FIG. 1 is a perspective view of one embodiment of the surface.
Figure 6:
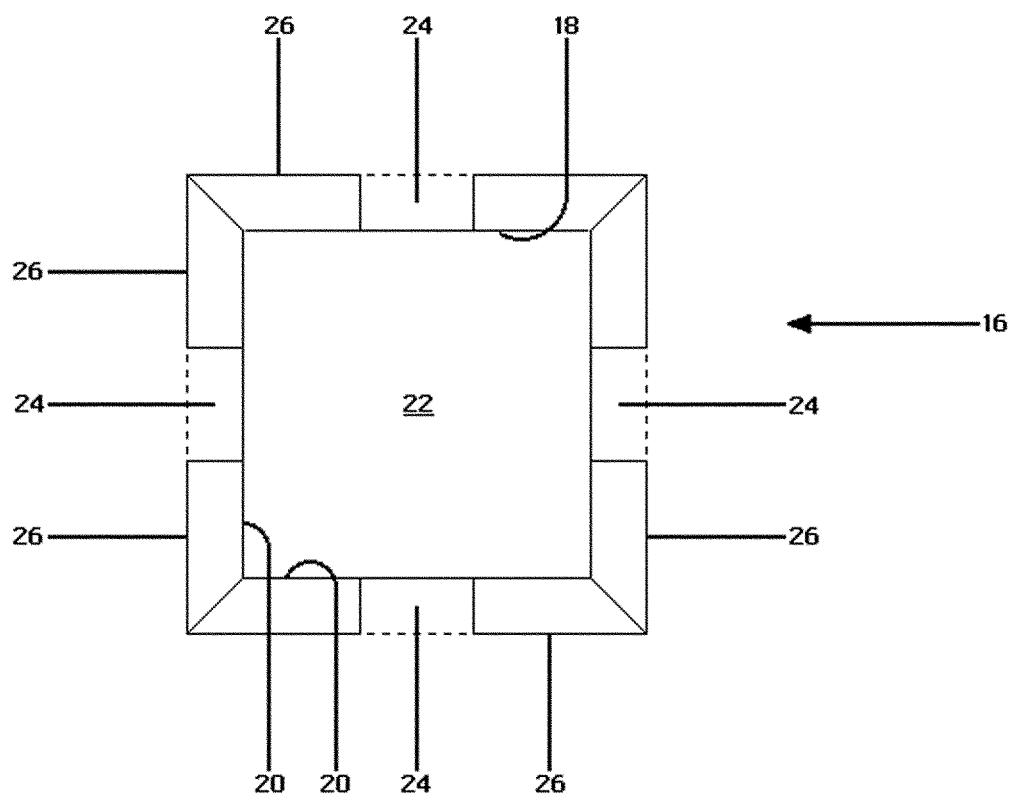
FIG. 6 is a plan view of a single cell of the surface shown in FIG. 1.
Figure 7:
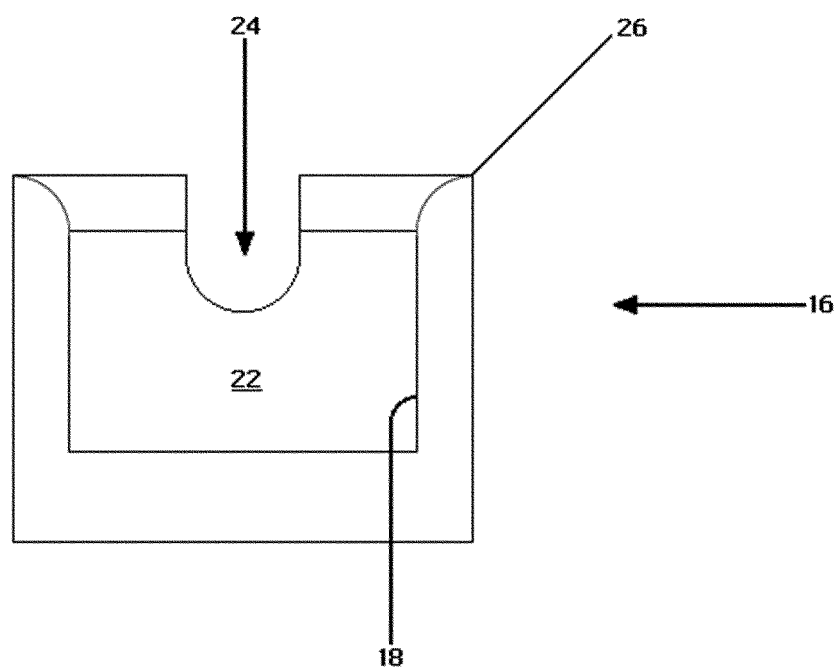
FIG. 7 is a cross-sectional elevation view taken along line 7-7 of FIG. 1.

FIGS. 1, 6, and 7 show a liquid controlling surface 10 having walls 18 whose tops 26 are rounded, thus providing somewhat more comfort to the feet of the user. In this configuration, the walls 18 are tapered towards their tops 26 so as to reduce the contact between the surface 10 and an object resting thereon. However, the walls 18 form non-pointed contact areas. It will be appreciated that rounded tops 26 are less likely than pointed tops to dig uncomfortably into a user's foot. Further, since in this application of the invention it is desirable to retain the dripping water, the distribution channels can be set to a higher level to permit more liquid to accumulate in each well. In this case the use of the channel at 80% of the total wall height might be preferred.

Figure 3:
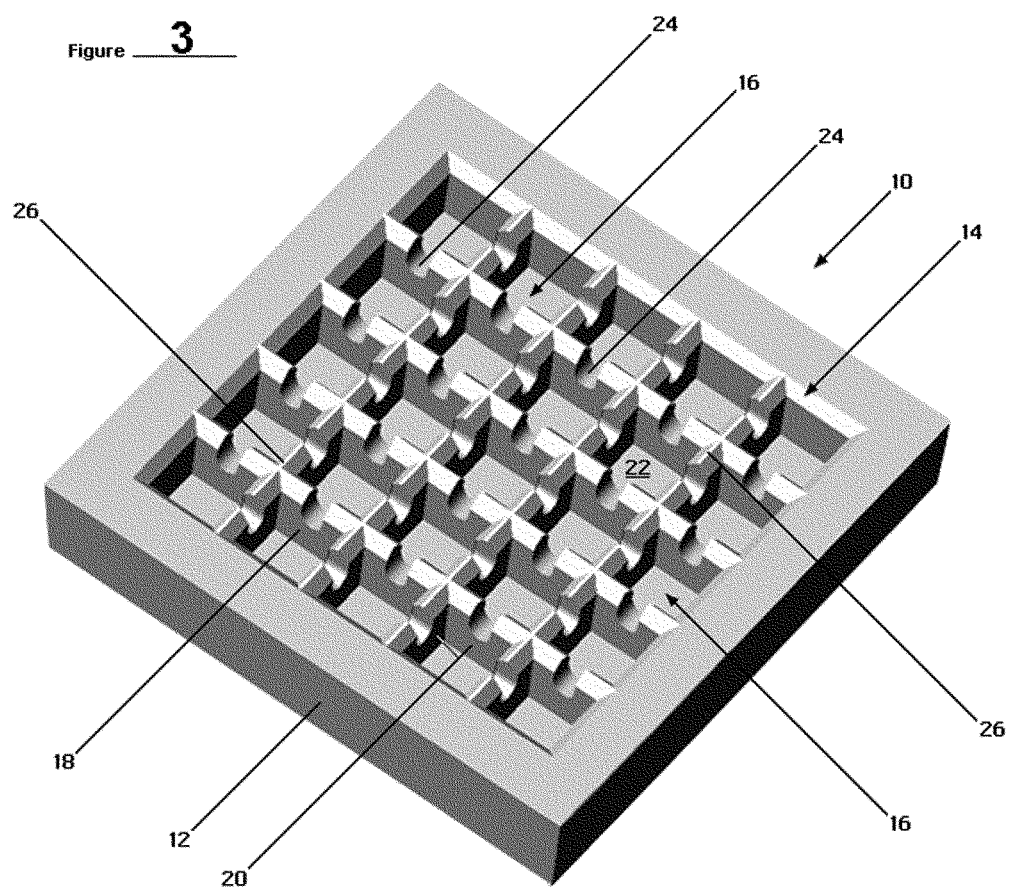
FIG. 3 is a perspective view of a third embodiment of the surface.

In the embodiment of the surface 10 shown in FIG. 3, the walls 18 are tapered toward their tops 26 so as to reduce the contact area between the surface 10 and an object resting thereon, but the tops 26 are not pointed. Rather, in the embodiment of FIG. 3, the tops 26 are non-pointed, narrow, horizontal surfaces which form the contact area between the surface 10 and an object resting thereon. It will be appreciated that this configuration of the tops 26 would also be more comfortable to the foot of the user than the pointed configuration.

Figure 4:
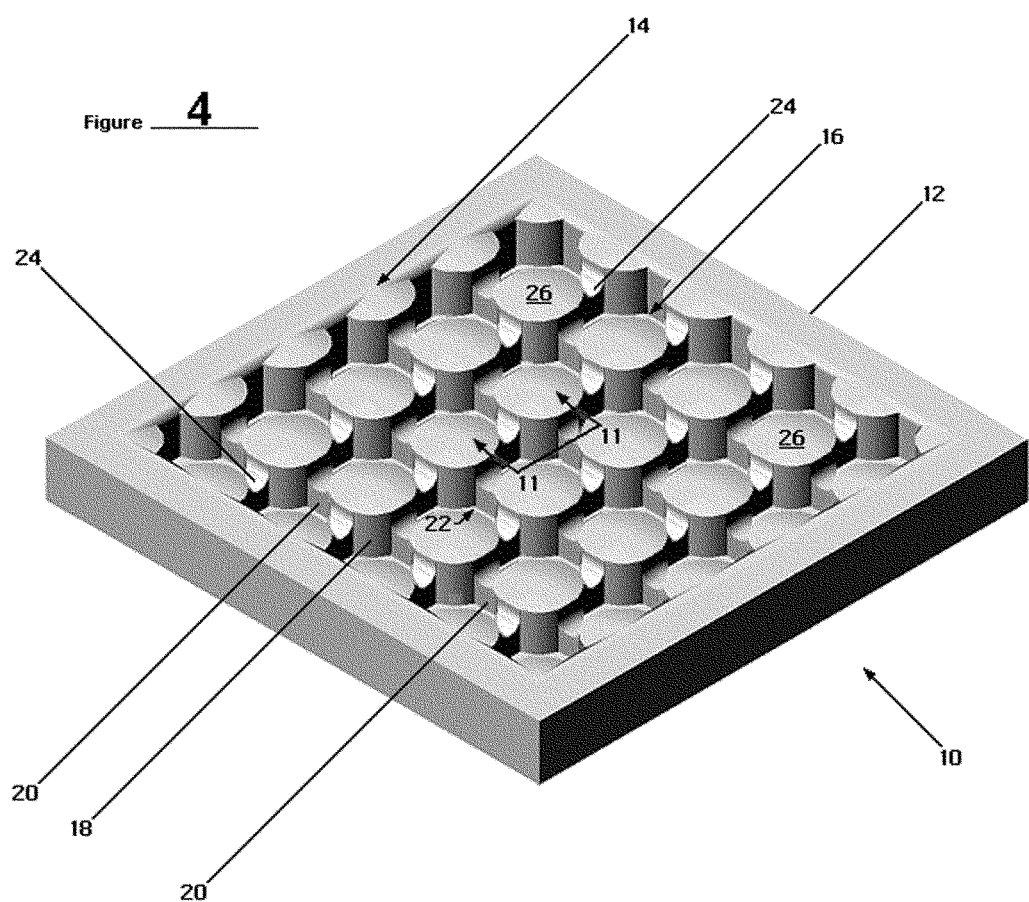
FIG. 4 is a perspective view of a fourth embodiment of the surface.
Figure 10:
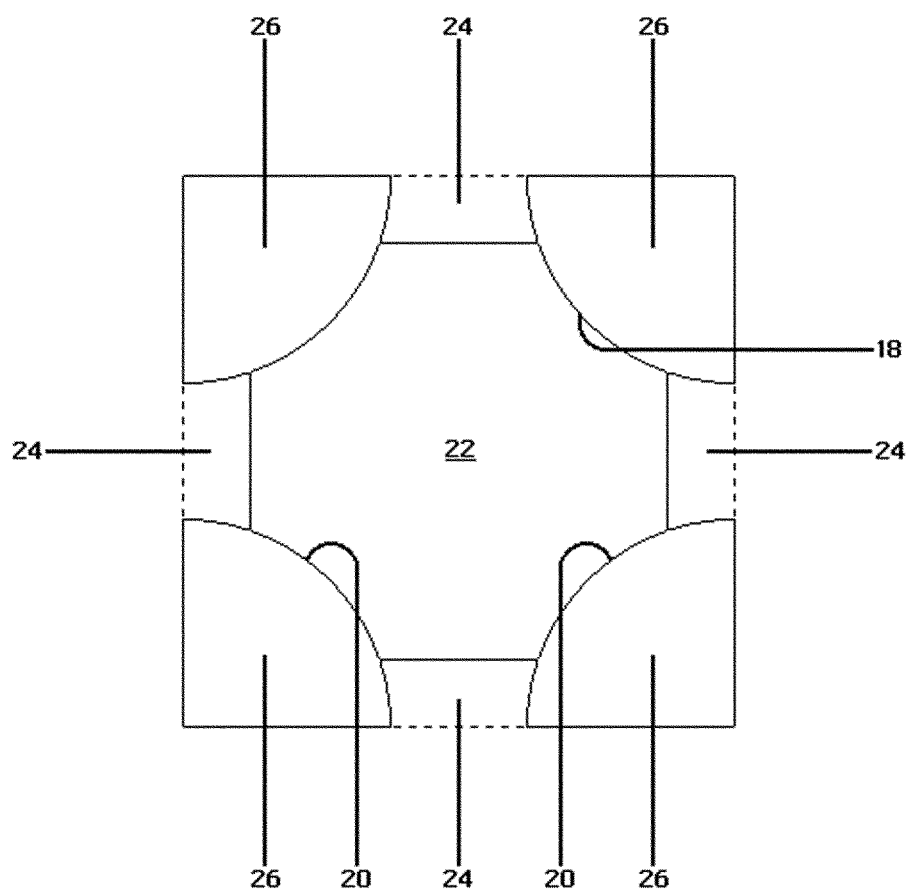
FIG. 10 is a plan view of a single cell of the surface shown in FIG. 4.
Figure 11:
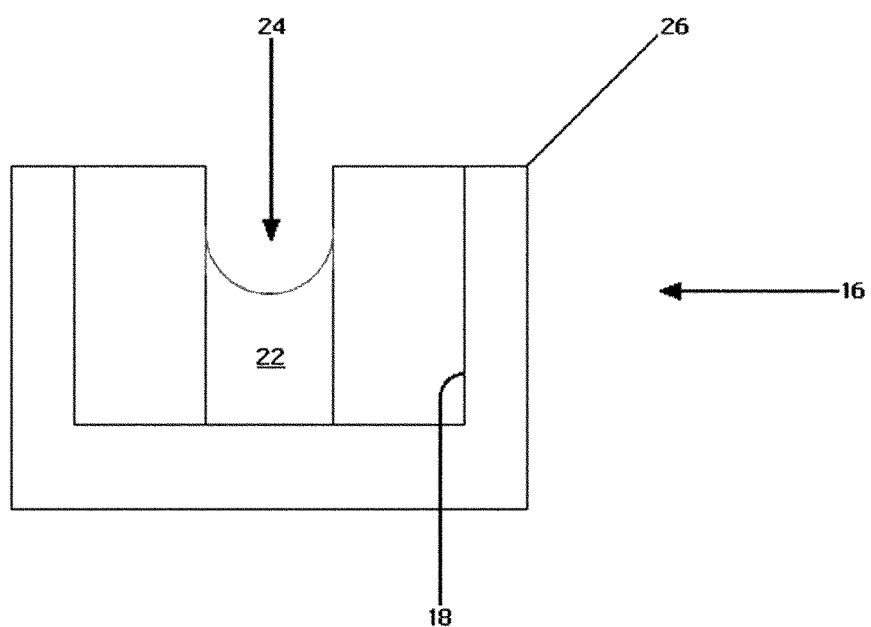
FIG. 11 is a cross-sectional elevation view along line 11-11 of FIG. 4.

FIGS. 4, 10, and 11 show a further embodiment of the surface 10. In the embodiment of FIGS. 4, 10, and 11, the cells 16 and walls 18 are sized and shaped so as to provide contact areas that are generally circular in plan view. In other words, when viewed from above the surface 10, the contact areas are generally circular. It will be appreciated that such a configuration, which provides a substantial flat contact area, is quite comfortable for the foot of the user relative to a configuration where the tops 26 are pointed and provides a relatively large well volume between the contact areas.

Figure 5:
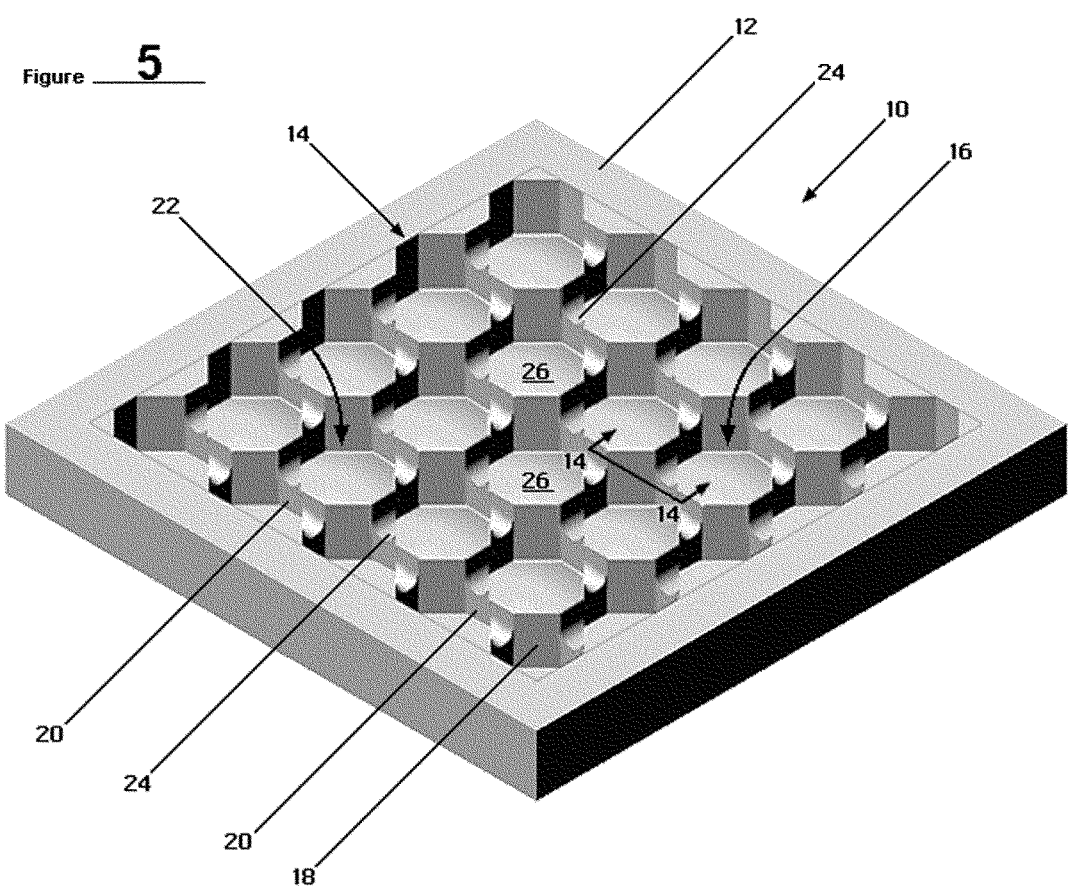
FIG. 5 is a perspective view of a fifth embodiment of the surface.
Figure 13:
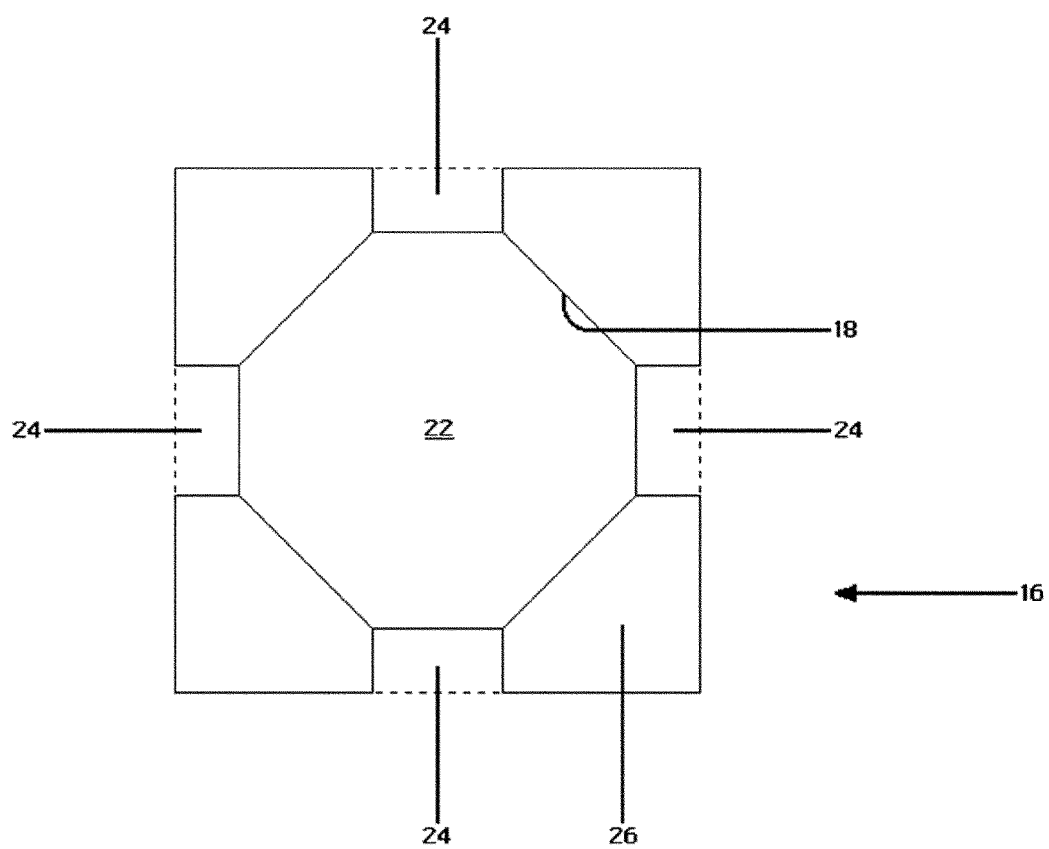
FIG. 13 is a plan view of a single cell of the surface of FIG. 5.
Figure 14:
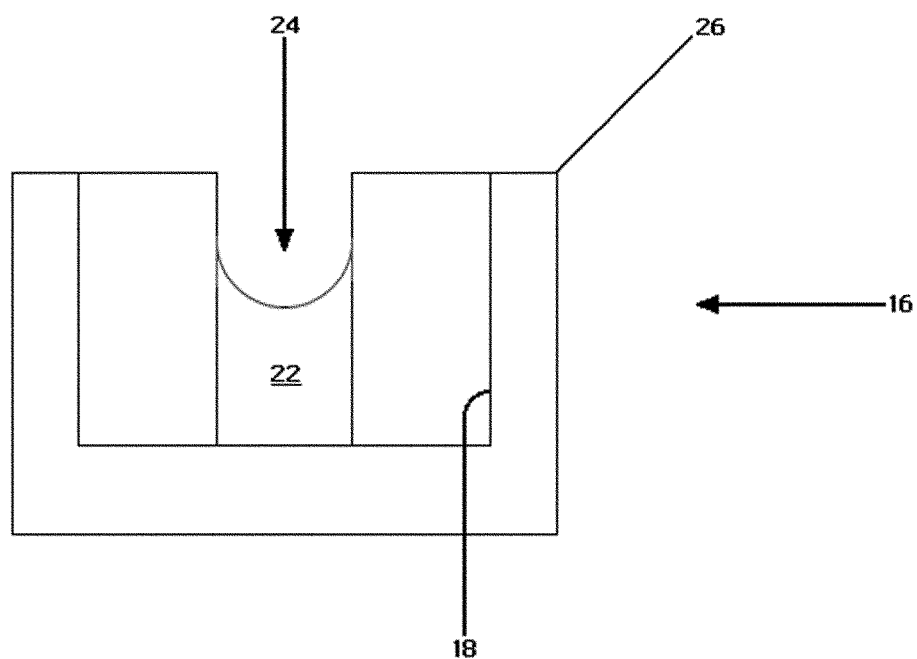
FIG. 14 is a cross-sectional elevation view along line 14-14 of FIG. 5.

Yet another embodiment of the surface 10 is shown in FIGS. 5, 13, and 14. In this embodiment, the walls 18 and cells 16 are sized and shaped so as to provide contact areas that are generally octagonal in plan view. Like the circular contact areas of FIG. 4, these octagonal contact areas provide a substantial flat contact area, which provides comfort to the foot of a user.

Figure 12:
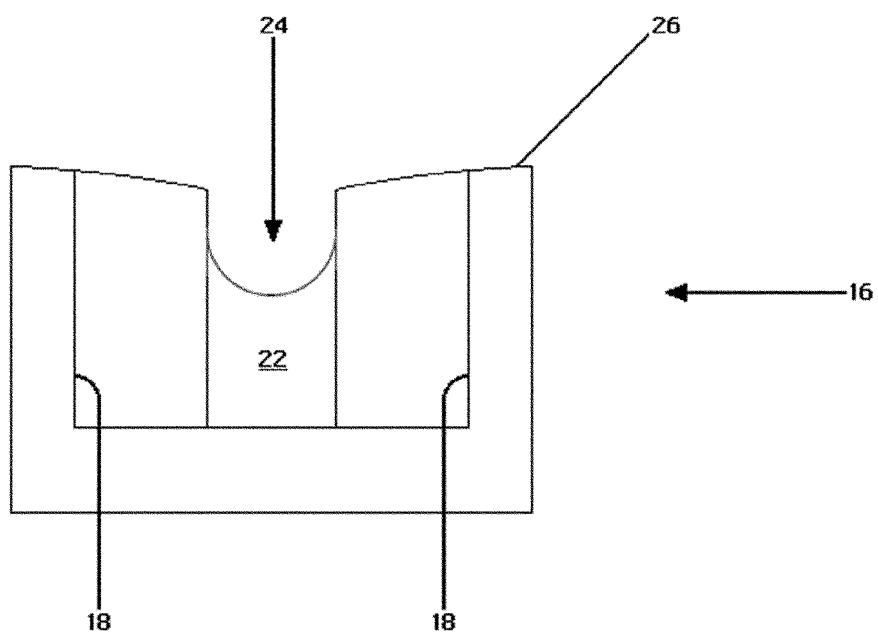
FIG. 12 is a cross-sectional elevation view, similar to that of FIG. 11, of a cell having a generally circular convex contact surface.

FIG. 12 shows a variant of the embodiment shown in FIG. 4. Specifically, in the variant shown in FIG. 12, the contact areas are generally circular in plan view, and are also convex, i.e., they are not flat, but they bulge outward toward an object resting on the surface 10. It will be appreciated that this configuration is particularly useful for shower and bath surfaces, because the convex contact areas can produce a pleasant, massage-like feeling on the soles of a user's feet. As well, because the contact area bulges outward from the surface 10, liquid on the contact surfaces is encouraged to drain towards adjacent cells.

It can now be appreciated how the surface 10 functions. The surface 10 includes a plurality of cells 16, each of which has a well 22 for holding liquid. Each well 22 has a predetermined cell liquid level limit, which, in the preferred embodiment, is the level above which liquid will be channelled to adjacent cells 16. When a cell 16 reaches its limit, additional liquid is channelled to adjacent cells 16. When adjacent cells 16 reach their limit, liquid is channelled to other adjacent cells 16. Thus, when a spill takes place on one portion of a surface 10, once the capacity of the cells 16 that initially receive the spill is exceeded, liquid is automatically channelled to adjacent cells 16 by gravity, which will continue to distribute the liquid to additional cells 16 if their well capacity is exceeded. Thus, as liquid is distributed progressively further from the point of origin of the spill, more and more cells 16 are brought into service to contain liquid from that spill. The number grows exponentially as liquid from the spill moves outward from the spill's point of origin. The higher the number of cells 16 in use to contain the spill, the less the amount of liquid that each channel needs to distribute to adjacent cells. In other words, during and immediately after a spill at a particular point on the surface 10, the one or more cells 16 at the point of origin of the spill will channel a relatively high volume of liquid to adjacent cells. However, each cell on the surface 10 has adjacent cells, and each of these adjacent cells itself has adjacent cells, and so on. Thus, after the spill is complete, the liquid is distributed over a much wider area of the surface 10 than the immediate spill area, with a large number of cells 16 holding and distributing the liquid from the spill.

Thus, for example, it will be appreciated that if the surface 10 is on a level surface, and all of the cells within the formation are filled up to the height of their respective distribution channels, any additional liquid from a new or continued spill received in the formation would be disseminated equally between all cells within the formation, regardless of the distance from the location of the new or continued spill.

In addition, the shaping of the cells 16, walls 18, and tops 26 can be varied to achieve particular results. In many uses, it is preferred to minimize the contact area between the surface 10 and an object resting thereon. The reason for this is that liquid left on the contact area might be undesirably transferred to the object resting on the surface 10. Thus, by giving the walls 18 a shape to minimize contact area, and to quickly drain such undesirable transfer of liquid can be minimized. This goal of reducing contact area may be achieved by walls 18 having the pointed tops 26. It is also achieved, to a lesser extent, by the shaping of the walls 18 and cells 26 as shown in FIGS. 1 and 3, for example. For other uses, the transfer of liquids from the mat to an object is less of a concern, but the comfort of a user is a greater concern. An example of such a use is when the surface 10 is being employed as a mat in a bathroom outside of a bath or shower. In such a case, the user's bare feet will be on the mat. As explained above, the shaping of walls 18 and tops 26 shown in FIGS. 1, 4, 5, and 12 will provide greater comfort to a user's bare foot. In particular, the contact area shown in FIG. 12, namely, a plurality of convex circular contact areas, provides a comfortable and pleasant feeling to a user's foot.

In addition, it will be appreciated that the cells 16 and distribution channels 24 are sized, shaped, and mutually positioned to reduce the likelihood that an object resting on the surface 10 will come into contact with liquid contained within the surface 10.

This is achieved without the complex two-layer construction shown in U.S. Pat. No. 5,776,583. In that construction, each cell constitutes a bottom hollow portion which holds all of the liquid. Complex features are required to sustain this two-layer structure. By contrast, the surface 10 disclosed herein distributes liquid from the point of origin of a spill through distribution channels 24 sized, shaped, and positioned to keep the liquid being distributed between cells 16 from coming in contact with an object resting on the surface 10.

It will be appreciated that the dimensions of the cells 16, walls 18, wells 22, channels 24, and tops 26 can be varied according to the circumstances in which the surface 10 will be used. For example, in circumstances where spills are likely to happen quickly, with substantial amounts of liquid involved, it is better to have wells 22 that are deeper, and distribution channels 24 having greater flow capacities. The reason for this is that with quick, high volume spills, a low-capacity well and/or distribution channel may be overwhelmed by the volume and speed of the spill, thus causing liquid to flood over the walls 18, and possibly, over the perimeter wall 12, which is undesirable. The wells 22 and channels 24 need sufficient capacity to handle spills that are likely to happen in the intended application, so the surface 10 may control the spill and also, so the liquid will not be undesirably deposited on the tops 26 so as to come into contact with objects resting on the surface 10. On the other hand, where individual spills are likely to contain low liquid volumes, or to be slow spills or leaks, it is preferable to have wells are that shallower. The reason is that deeper, higher-capacity wells require a thicker surface 10. This in turn results in a surface that is heavier, and uses a larger amount of material. Unless this extra material is required, for example, for the reasons described above, it is preferable to use less material and incur less expense for materials, as well as to have a surface 10 that is as lightweight and easily manipulable as possible.

Figure 15:
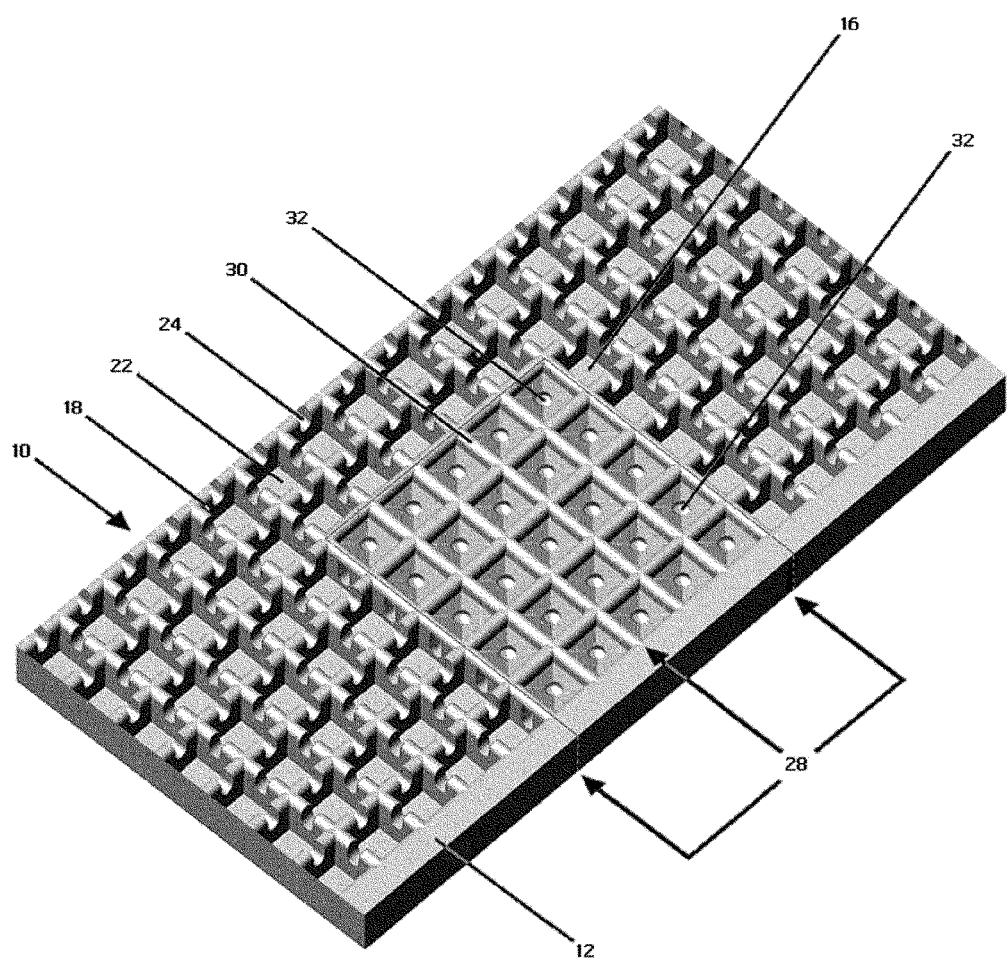
FIG. 15 is a perspective view of an embodiment of the surface that includes a reservoir.
Figure 16:
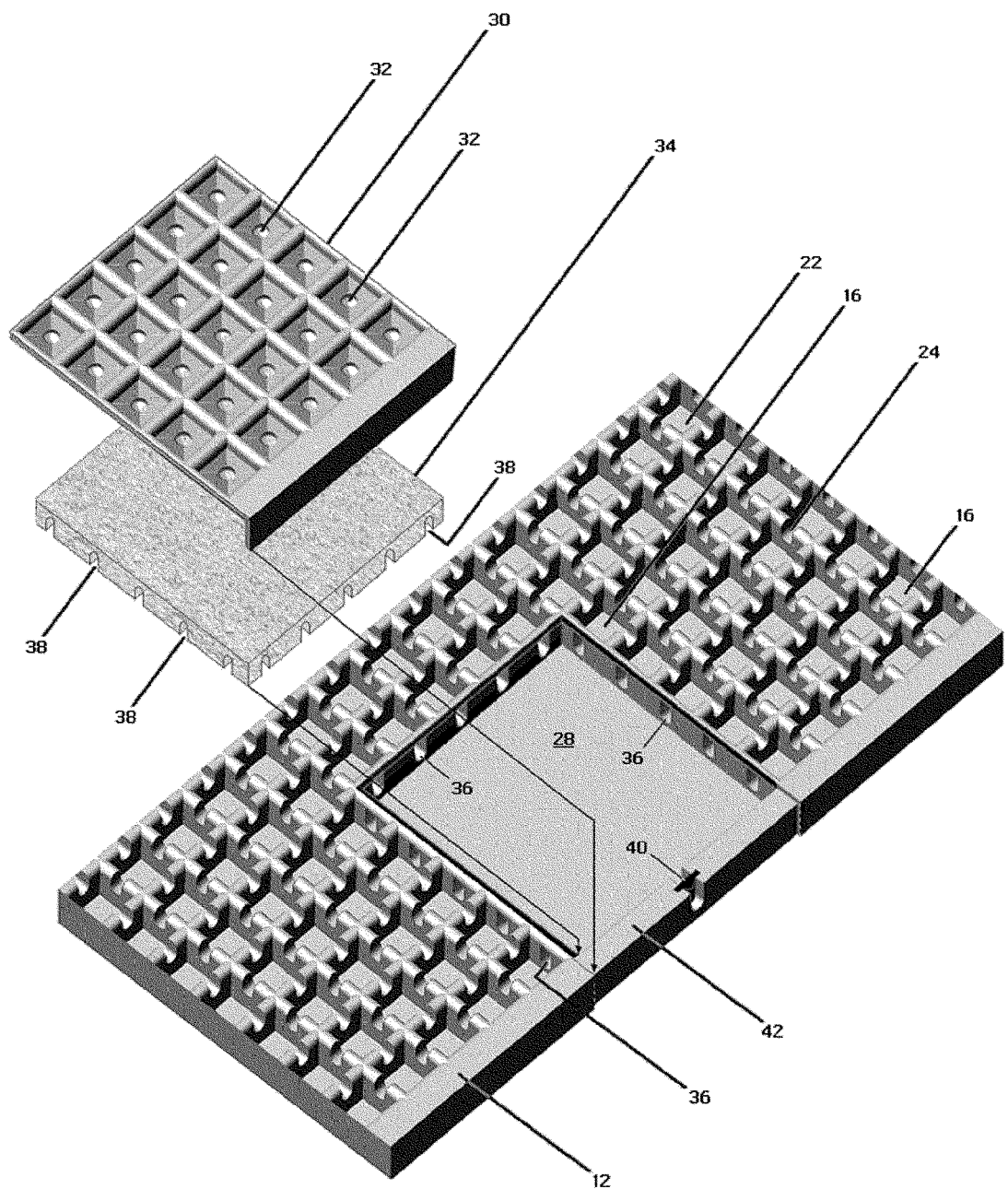
FIG. 16 is an exploded view of the surface of FIG. 15.

FIGS. 15 and 16 show a further embodiment of the invention. In the surface 10 of FIGS. 15-16, a portion of a surface 10 is shown. The surface includes a perimeter wall 12, formation 14, and cells 16 as described above. However, one section of the surface 10 within the perimeter wall 12 is reserved for a reservoir 28 having a removable cover 30. The top portion of the cover 30 presents a plurality of reservoir drains 32, through which liquid travels through the cover 30 to the reservoir 28. Contained within the reservoir 28 is an absorbent material 38 (e.g. a sponge or desiccant body). Liquid can also enter the reservoir 28 from cells 16 adjacent thereto, travelling through reservoir channels 36. The absorbent material 38 has absorbent material channels 38 which are positioned to line up with the reservoir channels 36. Preferably, the absorbent material channels 38 do not extend through the entirety of the absorbent material 34. Rather, the absorbent material channels 38 preferably function to direct liquid received from adjacent cells 16 to a central portion of the absorbent material 34.

The cover 30 preferably rests in a cover recess 42 formed in the perimeter wall 12. This embodiment of the surface 10 further includes a selectively openable and selectively closeable gate drain 40, connecting the reservoir 28 to the outside of the surface 10 through the perimeter wall 12. Most preferably, the drain takes the form of a sliding gate which can be actuated by the fingers of the user of the surface 10. As another possibility, a drain may be employed in the base of the surface, and act automatically, for a like purpose. Such a drain in the base of the surface may be positioned so as to drain liquid from the reservoir 28.

It will be appreciated that the reservoir 28 is useful in situations where the surface is being used on an inclined surface. In such situations, liquid is much more likely to travel toward the lower end of the surface 10 and collect there. In situations where the incline is steep enough, the liquid may spill over the perimeter wall 12 at the lower end of the surface 10. The reservoir 28 is thus useful for collecting such liquid and holding it within the reservoir 28, preferably in the absorbent material 38. Using the selectively openable and closeable reservoir drain 40, the liquid collected in the reservoir 28 can be removed, and the absorbent material changed or squeezed out for reuse.

It will be appreciated that the reservoir may take other forms besides that described above, and still be comprehended by the invention. For example, the reservoir 28 need not have a drain 40 as described: liquid can be removed simply by pouring it out and/or squeezing the absorbent material. Alternatively, a reservoir 28 may be employed without the use of absorbent material 34, if the liquid is not likely to enter the reservoir 28 at a high enough volume to require absorbent material 34.

In addition, the reservoir 28 may be used without reservoir drains 32. In some circumstances, it may be desirable for the reservoir to collect liquid only from adjacent cells 16. It will be appreciated, however, that, in the preferred embodiment, reservoir drains 32 are used so that if liquid spills onto the cover 30, it will be collected by the surface 10, and in particular, the reservoir 28. From these examples, it will be appreciated by those skilled in the art that a reservoir 28 may, depending on the circumstances, be employed without the specific other features described herein in association with the reservoir.

In some applications, it may be desirable to configure the surface 10 so that liquid flows more toward one section of the mat and away from another. This can be achieved in a number of ways. For example, wells 22 of cells 16 in one or more sections of the surface can be made shallow to cause liquid to flow away from these sections more quickly to liquid retaining sections of the surfaces whose cells 16 have deeper wells 22. As another example, the surface 10 may have a base whose thickness varies depending on the location on the surface. The result is that some cells to be higher than others, and causing liquid flow from the higher cells 16 to the lower cells 16. One use of such a feature is to cause liquid to flow away from a portion of the surface 10 where an object is likely to contact the surface 10, thus providing further protection against the possibility that liquid will be transferred from the surface 10 to the object.

It will be appreciated that a drain can be fitted in the base of the surface 10 to drain liquid from one or more of the cells 16, even in configurations lacking a reservoir 28. Such a drain can be useful in configurations, just described, in which liquid is encouraged to flow away from certain portions of the surface and to others.

While the foregoing embodiments of the present invention has been set forth in considerable detail for the purposes of making a complete disclosure of the invention, it will be apparent for those skilled in the art that various modifications can be made to the device without departing from the broad scope of the invention as defined in the attached claims. Some of these variations are discussed above and others will be apparent to those skilled in the art. For example, a wide variety of different shapes for the walls 18 and tops 26 are possible within the scope of the attached claims. As another example, the surface 10, while preferably generally rectangular in plan view, can be any convenient shape. Similarly, the cells 16, while generally rectangular in plan view, can take other shapes (e.g. as shown in FIGS. 4 and 5). What is important is to provide a surface 10 for controlling liquids.

The invention claimed is:

1. A liquid controlling surface, comprising:
   a formation comprising a plurality of individual open topped, closed bottomed cells for containing liquid, each of said cells having a cell wall integral with the closed bottom, and defining a well, each of said cell walls having a top edge;
   a plurality of distribution channels extending between adjacent cells and being positioned on the cell wall at a height to permit liquid to drain to the adjacent cell when a cell liquid level exceeds a predetermined limit and to permit liquid to be retained in said well up to said limit; and
   at least some of said cell walls being sized and shaped to define contact areas at said top edges and having sufficient rigidity to support an object above said limit, wherein said object is a foot of a person, or a wheel of a vehicle.

2. The liquid controlling surface as claimed in claim 1, wherein each of said distribution channels is sized and shaped to inhibit said object supported by said contact areas from contacting liquid in the cells or the distribution channels.

3. The liquid controlling surface as claimed in claim 1, wherein the cell walls have average thicknesses sufficient to support said object on said contact areas, and wherein at least some of said cell walls taper upwardly to said contact areas so as to:
   a) reduce a surface area of said contact areas to help reduce liquid transfer to said object supported thereon; or
   b) promote drainage of liquids from said contact areas to help reduce liquid transfer to said object supported thereon.

4. The liquid controlling surface as claimed in claim 3, where the cell walls taper upwardly substantially to a point at said top edges.

5. The liquid controlling surface as claimed in claim 3, wherein the tapered cell walls have non-pointed top edges.

6. The liquid controlling surface as claimed in claim 1, wherein said contact areas are generally circular in plan view.

7. The liquid controlling surface as claimed in claim 1, wherein said contact areas are generally octagonal in plan view.

8. The liquid controlling surface as claimed in claim 1, wherein said contact areas bulge outward to encourage draining of liquid from the contact areas to the cells.

9. The liquid controlling surface as claimed in claim 1, further comprising a perimeter wall surrounding said cells, the perimeter wall having a height higher than said distribution channels to prevent liquid from leaking from said cells to an area outside the perimeter wall.

10. The liquid controlling surface as claimed in claim 9, wherein the formation and perimeter wall comprise rubber.

11. The liquid controlling surface as claimed in claim 10, wherein said rubber is recycled moulded rubber sourced from tires.

12. The liquid controlling surface as claimed in claim 9, wherein the formation and perimeter wall comprise plastic.

13. The liquid controlling surface as claimed in claim 12, wherein the plastic is recycled plastic.

14. The liquid controlling surface as claimed in claim 9, wherein the formation and the perimeter wall are a unitary construction.

15. The liquid controlling surface as claimed in claim 9, wherein the surface further comprises at least one reservoir channel and a reservoir positioned adjacent said formation and configured to receive liquid from the reservoir channels.

16. The liquid controlling surface as claimed in claim 15, wherein said perimeter wall surrounds said formation and reservoir.

17. The liquid controlling surface as claimed in claim 15, wherein the surface further includes a drain positioned to drain liquid from the reservoir.

18. The liquid controlling surface as claimed in claim 15, wherein the reservoir contains an absorbent material for absorbing liquid moving into the reservoir.

19. The liquid controlling surface as claimed in claim 15, wherein the surface further comprises a removable reservoir cover.

20. The liquid controlling surface as claimed in claim 9, wherein said perimeter wall is free of distribution channels.

21. The liquid controlling surface as claimed in claim 1, wherein the distribution channels comprise arcuate depressions extending across the cell walls.

22. The liquid controlling surface as claimed in claim 1, wherein the formation is generally rectangular in plan view.

23. The liquid controlling surface as claimed in claim 1, wherein the cells are generally rectangular in plan view.

24. The liquid controlling surface as claimed in claim 1, wherein each of said cells comprises a well for holding liquid, the distribution channels being positioned at a top of the well, the cell wall being sized and shaped to surround the well.

25. The liquid controlling surface as claimed in claim 1, wherein the surface includes a drain positioned to drain liquid from one or more cells.

26. The liquid controlling surface as claimed in claim 1, wherein the surface comprises a liquid-flow-away section and a liquid retaining section, and wherein an average well depth in the liquid-flow-away section is less than an average well depth in the liquid retaining section to cause liquid to move from the liquid-flow-away section to the liquid retaining section.

27. The liquid controlling surface as claimed in claim 1, wherein the surface comprises a liquid-flow-away section and a liquid retaining section, and wherein an average cell height, above a floor, in the liquid-flow-away section, is greater than an average cell height, above the floor, in the liquid retaining section, to cause liquid to move from the liquid-flow-away section to the liquid retaining section.

28. The liquid controlling surface as claimed in claim 1, wherein the surface comprises a plurality of surface modules connected together.

29. The liquid controlling surface as claimed in claim 1, wherein the surface is a ground covering.

30. The liquid controlling surface as in claim 29, wherein said ground covering is a mat.

31. The liquid controlling surface as claimed in claim 1, wherein the distribution channels comprise square depressions extending across the cell walls.

32. The liquid controlling surface as claimed in claim 1, wherein the distribution channels comprise V-shaped depressions extending across the cell walls.

33. The liquid controlling surface as claimed in claim 1, wherein the distribution channels comprise holes extending through the cell wells.

\* \* \* \* \*

UNITED STATES PATENT AND TRADEMARK OFFICE
CERTIFICATE OF CORRECTION

| | | |
|---|---|---|
| PATENT NO. | : 8,685,525 B2 | Page 1 of 1 |
| APPLICATION NO. | : 13/458175 | |
| DATED | : April 1, 2014 | |
| INVENTOR(S) | : James Sanderson et al. | |

It is certified that error appears in the above-identified patent and that said Letters Patent is hereby corrected as shown below:

In the Claims

Column 12, Line 19, Claim 33, delete "wells" and insert -- walls --

Signed and Sealed this
Twenty-second Day of July, 2014

Michelle K. Lee
*Deputy Director of the United States Patent and Trademark Office*